United States Patent
Howard et al.

(10) Patent No.: US 8,887,238 B2
(45) Date of Patent: Nov. 11, 2014

(54) MECHANISM FOR ESTABLISHING REPUTATION IN A NETWORK ENVIRONMENT

(75) Inventors: Lee Howard, Fairfax, VA (US); Chris Roosenraad, Herndon, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 305 days.

(21) Appl. No.: 13/313,933

(22) Filed: Dec. 7, 2011

(65) Prior Publication Data

US 2013/0148653 A1   Jun. 13, 2013

(51) Int. Cl.
*G06F 7/04* (2006.01)

(52) U.S. Cl.
USPC ........................................ 726/3; 726/1; 726/2

(58) Field of Classification Search
CPC ...... H04L 63/1408; H04L 63/14; H04L 9/002
USPC .......................................................... 726/3
See application file for complete search history.

(56) References Cited

U.S. PATENT DOCUMENTS

| | | | |
|---|---|---|---|
| 2003/0056217 A1 | 3/2003 | Brooks | |
| 2006/0031359 A1* | 2/2006 | Clegg et al. | 709/206 |
| 2006/0130107 A1 | 6/2006 | Gonder | |
| 2007/0208817 A1* | 9/2007 | Lund et al. | 709/206 |
| 2007/0217436 A1 | 9/2007 | Markley | |
| 2008/0059301 A1* | 3/2008 | Granville | 705/14 |
| 2008/0186203 A1* | 8/2008 | Vaswani et al. | 340/870.11 |
| 2009/0144259 A1* | 6/2009 | Sundaresan | 707/5 |
| 2011/0004932 A1* | 1/2011 | Spatscheck et al. | 726/13 |
| 2011/0185061 A1 | 7/2011 | Chen | |
| 2012/0002534 A1* | 1/2012 | Lissianoi | 370/216 |
| 2012/0079592 A1* | 3/2012 | Pandrangi | 726/22 |
| 2012/0182936 A1* | 7/2012 | Haddad et al. | 370/328 |
| 2013/0007882 A1* | 1/2013 | Devarajan et al. | 726/24 |

OTHER PUBLICATIONS

Oro et al., "Benchmarking IP Blacklists For Financial Botnet Detection" Information Assurance and Security (IAS), 2010 Sixth International Conference on pp. 62-67.*
Chowdhury et al., "PolyViNE: Policy-based Virtual Network Embedding Across Multiple Domains," Sep. 2010 Visa '10: Proceedings of the second ACM SIGCOMM workshop on Virtualized infrastructure systems and architectures pp. 49-56.*
"Let's Not Panic About The Transition To IPv6". downloaded from http://www.messagesystems.com/blog/?p=29, Oct. 29, 2011.

(Continued)

*Primary Examiner* — Luu Pham
*Assistant Examiner* — Roderick Tolentino
(74) *Attorney, Agent, or Firm* — Otterstedt, Ellenbogen & Kammer, LLP

(57) ABSTRACT

Traffic is obtained from a plurality of internet protocol version six addresses within a plurality of internet protocol version six blocks; and a first indication of inappropriate traffic is obtained from a first one of the addresses. Responsive thereto, a reputation score for a first given one of the blocks, containing the first one of the internet protocol version six addresses, is incremented by a first predetermined amount; and a reputation score for an adjacent block is incremented by a second predetermined amount which is less than the first predetermined amount. Traffic from the plurality of internet protocol version six addresses within the plurality of internet protocol version six blocks is passed or blocked in accordance with a policy based on the incremented reputation scores for the first block and adjacent block. Techniques for internet protocol version four (individual and network address translation aspects) are also provided.

20 Claims, 10 Drawing Sheets

(56) References Cited

OTHER PUBLICATIONS

Facebook: "Messagesystems". downloaded from http://www.facebook.com/messagesystems Oct. 29, 2011.

"The Register". Blacklist extinction looms downloaded Oct. 29, 2011 from http://www.theregister.co.uk/2011/03/08/ipv6_spam_filtering_headache/print.html.

"Overcoming the Fear of IPv6". downloaded Oct. 29, 2011 from http://blogs.cisco.com/borderless/overcoming-the-fear-of-ipv6/.

"Digging through the problem of IPv6 and email, part 1" D/L Oct. 29, 2011 http://blogs.msdn.com/b/tzink/archive/2011/03/22/digging-through-the-problem-of-ipv6-and-email-part-1.aspx.

"Digging through the problem of IPv6 and email, part 2" D/L Oct. 29, 2011 http://blogs.msdn.com/b/tzink/archive/2011/03/22/digging-through-the-problem-of-ipv6-and-email-part-2.aspx.

"Digging through the problem of IPv6 and email, part 3" D/L Oct. 29, 2011 http://blogs.msdn.com/b/tzink/archive/2011/03/22/digging-through-the-problem-of-ipv6-and-email-part-3.aspx.

"SPEWS" downloaded Oct. 30, 2011 from http://everything2.com/title/SPEWS.

The Spamhaus Project, downloaded from http://www.spamhaus.org/ Dec. 7, 2011.

Wikipedia, The Spamhaus Project, downloaded Dec. 7, 2011 from http://en.wikipedia.org/wiki/The_Spamhaus_Project.

\* cited by examiner

FIG. 5
PRIOR ART

| PREFIX | /48s | /56s | /64s | BITS |
|---|---|---|---|---|
| /24 | 16M | 4G | 1T | 104 |
| /25 | 8M | 2G | 512G | 103 |
| /26 | 4M | 1G | 256G | 102 |
| /27 | 2M | 512M | 128G | 101 |
| /28 | 1M | 256M | 64G | 100 |
| /29 | 512K | 128M | 32G | 99 |
| /30 | 256K | 64M | 16G | 98 |
| /31 | 128K | 32M | 8G | 97 |
| /32 | 64K | 16M | 4G | 96 |
| /33 | 32K | 8M | 2G | 95 |
| /34 | 16K | 4M | 1G | 94 |
| /35 | 8K | 2M | 512M | 93 |
| /36 | 4K | 1M | 256M | 92 |
| /37 | 2K | 512K | 128M | 91 |
| /38 | 1K | 256K | 64M | 90 |
| /39 | 512 | 128K | 32M | 89 |
| /40 | 256 | 64K | 16M | 88 |
| /41 | 128 | 32K | 8M | 87 |
| /42 | 64 | 16K | 4M | 86 |
| /43 | 32 | 8K | 2M | 85 |
| /44 | 16 | 4K | 1M | 84 |
| /45 | 8 | 2K | 512K | 83 |
| /46 | 4 | 1K | 256K | 82 |
| /47 | 2 | 512 | 128K | 81 |
| /48 | 1 | 256 | 64K | 80 |
| /49 |  | 128 | 32K | 79 |
| /50 |  | 64 | 16K | 78 |
| /51 |  | 32 | 8K | 77 |
| /52 |  | 16 | 4K | 76 |
| /53 |  | 8 | 2K | 75 |
| /54 |  | 4 | 1K | 74 |
| /55 |  | 2 | 512 | 73 |
| /56 |  | 1 | 256 | 72 |
| /57 |  |  | 128 | 71 |
| /58 |  |  | 64 | 70 |
| /59 |  |  | 32 | 69 |
| /60 |  |  | 16 | 68 |
| /61 |  |  | 8 | 67 |
| /62 |  |  | 4 | 66 |
| /63 |  |  | 2 | 65 |
| /64 |  |  | 1 | 64 |

IPv6 CHART
K=1,024
M=1,048,576
G=1,073,741,824
T=1,099,511,627,776

FIG. 10

| PREFIX | SCORE FOLLOWING SPAM FROM 2001:db8:1234:5678 | SCORE ADDED AFTER SPAM RECEIVED FROM 2001:db8:1234:5673 | TOTAL REPUTATION SCORE |
|---|---|---|---|
| 2001:db8:1234:566b:: | 0 | 1 | 1 |
| 2001:db8:1234:566c:: | 0 | 2 | 2 |
| 2001:db8:1234:566d:: | 0 | 4 | 4 |
| 2001:db8:1234:566e:: | 0 | 8 | 8 |
| 2001:db8:1234:566f:: | 0 | 16 | 16 |
| 2001:db8:1234:5670:: | 1 | 32 | 33 |
| 2001:db8:1234:5671:: | 2 | 64 | 66 |
| 2001:db8:1234:5672:: | 4 | 128 | 132 |
| 2001:db8:1234:5673:: | 8 | 256 | 264 |
| 2001:db8:1234:5674:: | 16 | 128 | 144 |
| 2001:db8:1234:5675:: | 32 | 64 | 96 |
| 2001:db8:1234:5676:: | 64 | 32 | 96 |
| 2001:db8:1234:5677:: | 128 | 16 | 144 |
| 2001:db8:1234:5678:: | 256 | 8 | 264 |
| 2001:db8:1234:5679:: | 128 | 4 | 132 |
| 2001:db8:1234:567a:: | 64 | 2 | 66 |
| 2001:db8:1234:567b:: | 32 | 1 | 33 |
| 2001:db8:1234:567c:: | 16 | 0 | 16 |
| 2001:db8:1234:567d:: | 8 | 0 | 8 |
| 2001:db8:1234:567e:: | 4 | 0 | 4 |
| 2001:db8:1234:567f:: | 2 | 0 | 2 |
| 2001:db8:1234:5680:: | 1 | 0 | 1 |

US 8,887,238 B2

MECHANISM FOR ESTABLISHING REPUTATION IN A NETWORK ENVIRONMENT

FIELD OF THE INVENTION

The present invention relates generally to communications systems and methods, and, more particularly, to spam prevention techniques and the like.

BACKGROUND OF THE INVENTION

Electronic mail ("e-mail" or "email"), is a technique for exchanging digital messages; it typically operates across the Internet or other computer networks. "Spam" is the indiscriminate sending of unsolicited bulk messages via electronic messaging systems. Email spam is spam comprising similar or identical messages sent to a large number of recipients by email.

Email service may be provided in a number of ways. In one non-limiting example, a subscriber of a content network such as a cable television network obtains not only entertainment, but also data services, such as Internet e-mail, over the content network; some subscribers may subscribe for data services only. Furthermore in this regard, until fairly recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream (toward the subscriber) only service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998 . DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience.

To prevent e-mail spam (aka unsolicited bulk email), various anti-spam techniques are employed. One of the primary techniques used to prevent spam in Internet Protocol version 4 (IPv4) is "reputation." When spam is received from a computer, its IP address is flagged as having a bad reputation. Various algorithms are used to decide how had a reputation is before action is taken. Generally, once an IP address has a bad reputation, email from that address is blocked. Different operators may decide how had an address can be before blocking.

SUMMARY OF THE INVENTION

Principles of the present invention provide a mechanism for establishing reputation in a network environment. In one aspect, an exemplary method includes the steps of obtaining traffic from a plurality of internet protocol version six addresses within a plurality of internet protocol version six blocks; and obtaining a first indication of inappropriate traffic from a first one of the internet protocol version six addresses. A further step, responsive to the first indication of inappropriate traffic, includes incrementing a reputation score for a first given one of the blocks, containing the first one of the internet protocol version six addresses, by a first predetermined amount; and incrementing a reputation score for a second given one of the blocks, adjacent the first given one of the blocks, by a second predetermined amount which is less than the first predetermined amount. A further step includes passing or blocking the traffic from the plurality of internet protocol version six addresses within the plurality of internet protocol version six blocks, in accordance with a policy based on the incremented reputation scores for the first and second given ones of the blocks.

In another aspect, another exemplary method includes the steps of obtaining traffic from a plurality of ports for a given internet protocol version four address, the ports comprising at least one of TCP ports and UDP ports; and obtaining a first indication of inappropriate traffic from a first one of the ports. Responsive to the first indication of inappropriate traffic, further steps include incrementing a reputation score for the first one of the ports, by a first predetermined amount; and incrementing a reputation score for a second one of the ports, adjacent the first one of the ports, by a second predetermined amount which is less than the first predetermined amount. A still further step includes passing or blocking the traffic from the plurality of ports, in accordance with a policy based on the incremented reputation scores for the first and second given ones of the ports.

In still another aspect, still another exemplary method includes the steps of obtaining traffic from a plurality of internet protocol version four addresses; and obtaining a first indication of inappropriate traffic from a first one of the internet protocol version four addresses. Responsive to the first indication of inappropriate traffic, further steps include incrementing a reputation score for the first one of the internet protocol version four addresses, by a first predetermined amount; and incrementing a reputation score for at least a second one of the internet protocol version four addresses, adjacent the first one of the internet protocol version four addresses, by a second predetermined amount which is less than the first predetermined amount. A further step includes passing or blocking the traffic from the plurality of internet protocol version four addresses in accordance with a policy based on the incremented reputation scores for the first and second internet protocol version four addresses.

In a further aspect, an exemplary apparatus includes at least one hardware processor; at least one network port coupled to the at least one hardware processor; at least one memory coupled to the at least one hardware processor; and at least two distinct software modules, each of the distinct software modules being embodied on a tangible computer-readable recordable storage medium. The distinct software modules include a score calculation module and a traffic policing module. The at least one network port is configured to obtain traffic from a plurality of internet protocol version six addresses within a plurality of internet protocol version six blocks. The at least one processor is configured to obtain a first indication of inappropriate traffic from a first one of the internet protocol version six addresses. The score calculation module, when loaded into the memory, causes the at least one hardware processor, in response to the first indication of inappropriate traffic, to: increment a reputation score for a first given one of the blocks, containing the first one of the Internet protocol version six addresses, by a first predetermined amount; and increment a reputation score for a second given one of the blocks, adjacent the first given one of the blocks, by a second predetermined amount which is less than the first predetermined amount. The traffic policing module, when loaded into the memory, causes the at least one hardware processor to pass or block the traffic from the plurality of internet protocol version six addresses within the plurality of Internet protocol version six blocks, in accordance with a policy based on the incremented reputation scores for the first and second given ones of the blocks.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, processing reputation in an intermediate system, before a message, packet, or data flow is received by the destination system, reduces load on the application server; the mail server or other system does not have to process reputation, and can be purpose-built for handling mail and/or other application(s). In another example, taking action (blocking or rate-limiting, for example) with respect to traffic from a sender with a poor reputation reduces the processing load on the destination system; the email server, for instance, only processes email that is wanted, and does not have to process spam.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 is a table depicting the number of /64 networks corresponding to each of a plurality of prefix lengths, as known in the prior art;

FIG. 10 shows exemplary scoring in accordance with an aspect of the invention.

DETAILED DESCRIPTION OF PREFERRED EMBODIMENTS

E-mail services may be provided over a variety of networks. Purely by way of example and not limitation, embodiments will be shown in the context of a cable multi-service operator (MSO) providing data services as well as entertainment services. It is to be emphasized, however, that embodiments of the invention can be employed in a variety of situations. For example, the mail server could belong to an independent organization, such as a mail hosting company (Gmail, Yahoo!, or AOL), who could also apply one or more techniques of the invention. Organizations such as private companies who run their own mail servers for their employees could use embodiments of the invention to protect their systems. Further, uses of embodiments of the invention are not limited to mail systems; in another embodiment, web servers which are subject to denial of service attacks could use aspects of the invention to implement rate-limiting or packet filtering. One or more embodiments of the invention could be applied to multiple servers in a data center, or even multiple systems correlated in multiple data centers, by sharing scores among several instances of systems in accordance with aspects of the invention.

Figure 1:
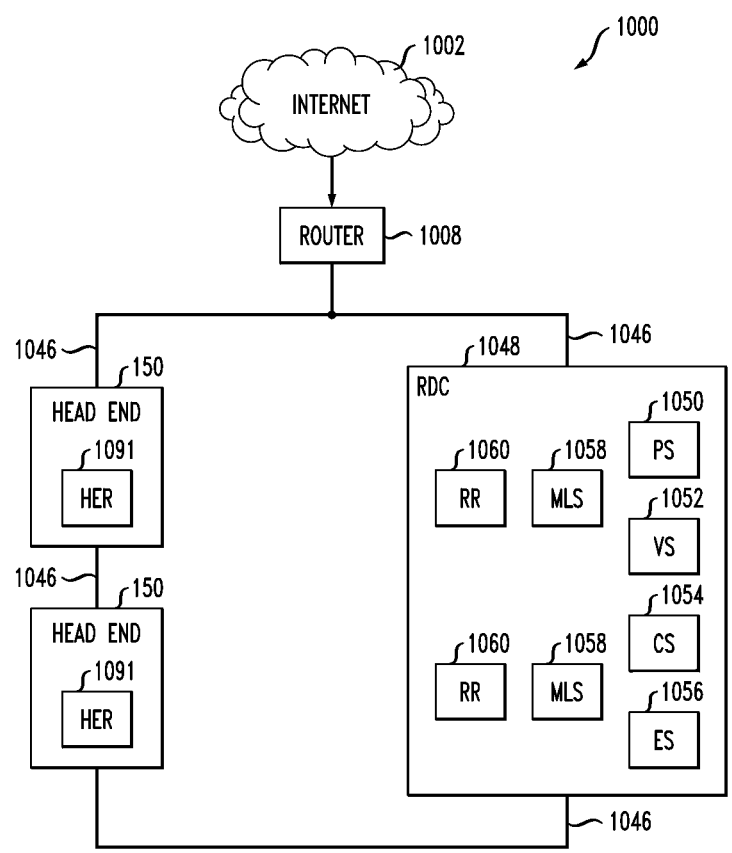
FIG. 1 is a block diagram of an exemplary embodiment of a system, within which one or more aspects of the invention can be implemented.

FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from FIGS. 2-4 below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

Figure 2:
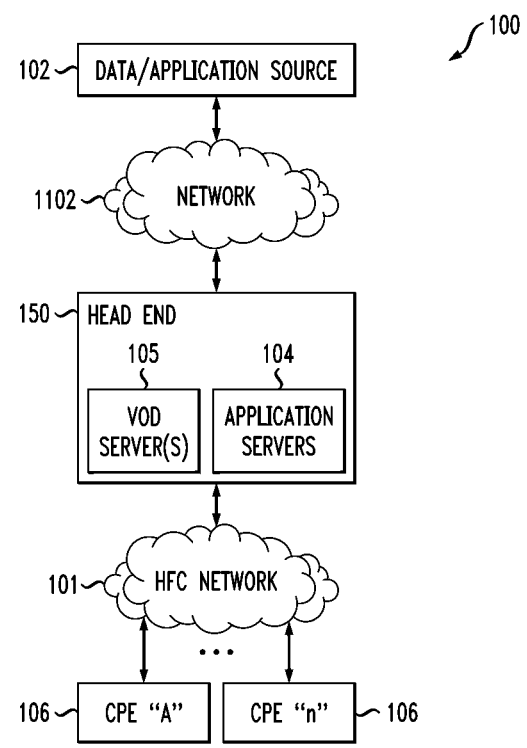
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within RDC 1048 or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Figure 3:
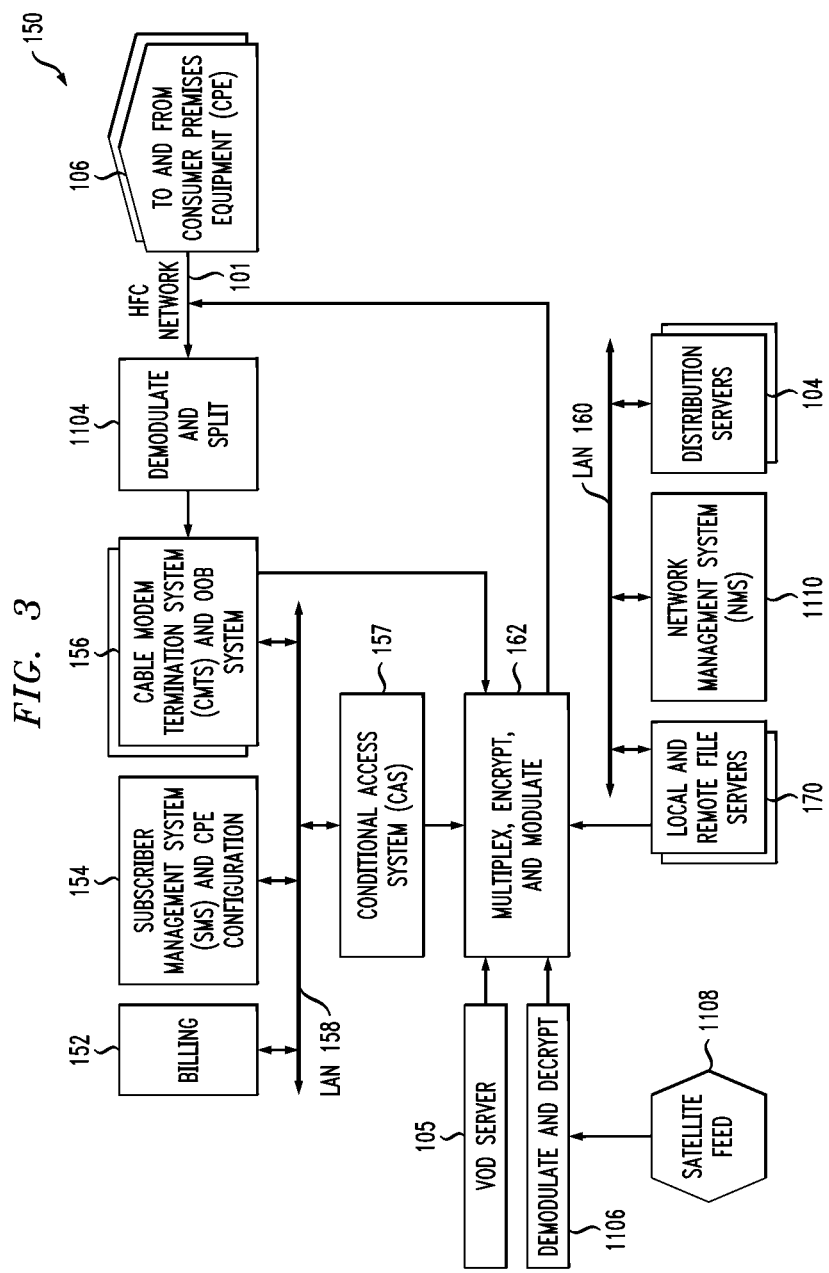
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc,) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as, for example, where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or aforementioned DOCSIS channels and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1104 are fed to CMTS and OOB system 156.

Figure 4:
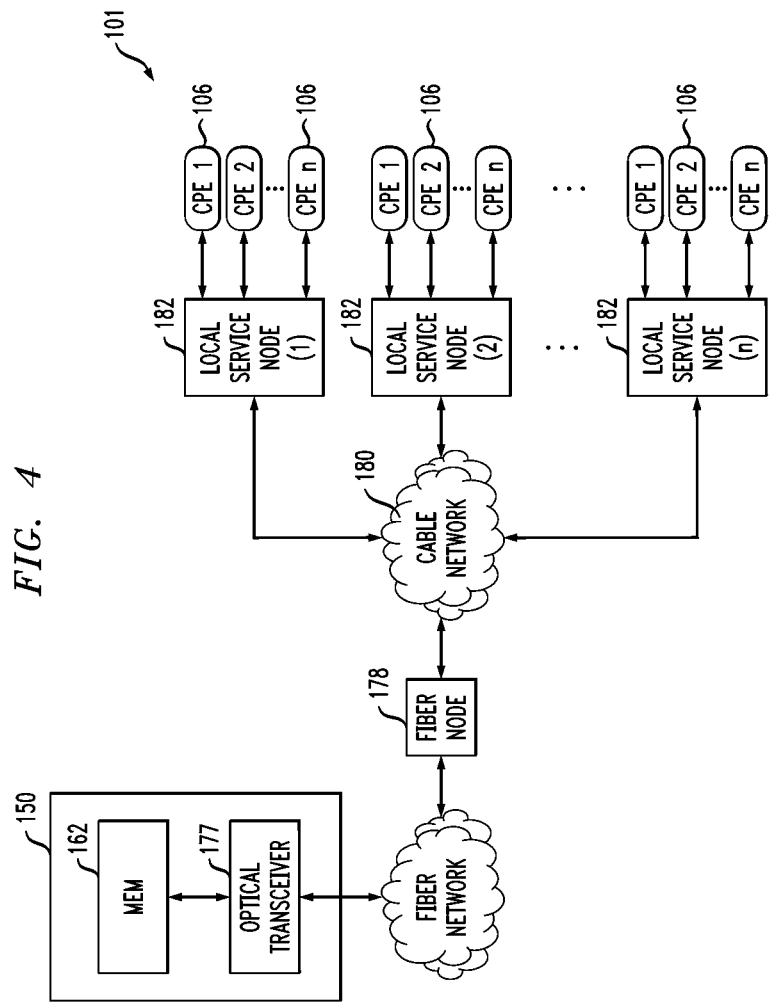
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM).

In another aspect, the network 101 may be a switched digital network, as known, for example, from US Patent Publication 2003/0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-4 also deliver Internet data services using the Internet protocol (IP), although other protocols and transport mechanisms of the type well known in the digital communication art may be substituted. The IP packets are typically transmitted on RF channels that are different that the RE channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

As noted above, one of the primary techniques used to prevent spam in IPv4 is "reputation." When spam is received from a computer, its IP address is flagged as having a bad reputation. Various algorithms are used to decide how bad a reputation is before action is taken. Generally, once an IP address has a bad reputation, email from that address is blocked. Different operators may decide how bad an address can be before blocking.

Preventing spam in Internet Protocol version 6 (IPv6) is much harder than in IPv4 . In IPv6, consumers are assigned large blocks of addresses (billions and billions), and computers often change their addresses within those block assignments. Blocking a single address will be ineffective if the address changes every 24 hours, which is the default behavior in WINDOWS. Further complicating matters, different network operators (Internet service providers or ISPs) assign different size blocks: it isn't possible to mark a block as malicious without knowing the size of the block.

Advantageously, one or more embodiments of the invention provide spam prevention techniques, suitable for use in IPv6, which allow organizations wishing to use it to do so independent of the actions of other organizations. One or more embodiments do not require new record types from the Internet Engineering Task Force (IETF), nor do they require misuse of existing IETF record types such as the TXT record type. One or more embodiments also do not require changing the use of the naming system to provide information for email abuse prevention, nor do they require widespread or universal adoption by ISPs. In addition, one or more embodiments do not require whitelisting techniques with assignment of specific address ranges for mail servers. This is advantageous as this latter approach (assignment of specific address ranges for mail servers) would require extensive policy work from the regional Internet registries and cooperation from all mail server operators.

Mail servers can employ technology in accordance with one or more aspects of the invention. One or more embodiments can be implemented, for example, in the context of mail server software and/or anti-spam server products.

In one or more embodiments, when spam or other malicious activity is seen, assign a negative reputation to the smallest size block that can be delegated (/64) (see discussion of IPv6 prefixes below); also assign a less negative reputation to adjacent blocks. If a malicious (or compromised) host moves around within a large address block, the entire block will quickly acquire a negative reputation. The system (mail server, etc.) can then decide to accept traffic only from hosts with sufficiently good reputations.

IPv6 addresses are typically delegated to residential users in ranges from /64-/48. The /xx notation indicates "two to the power of xx bits are the network number," so the number of addresses in a block is "two to the power of (128-xx)."

FIG. 5 shows the number of /64 networks to each of the listed prefix lengths. As depicted therein, the following prefixes have the following meanings:

K=1,024
M=1,048,576
G=1,073,741,824
T=1,099,511,627,776

The notation "/" refers to the number of bits in the given prefix. That is, the size of a block of addresses is indicated by a slash (/) and the decimal size of the network prefix; the specific addresses in the block are not explicitly specified in this approach. For example, an address block with 48 bits in the prefix is indicated by /48 . Such a block contains $2^{128-48} 2^{80}$ addresses. The smaller the numerical value of the network prefix, the larger the size of the block, since the prefix is subtracted from 128 to obtain the exponent to which two is raised to determine the number of available addresses. For example, a /56 prefix is four times larger than a /58 prefix ($2^{128-56}=2^{27}$ addresses; $2^{128-58}=2^{70}$ addresses; $2^{72}=2^{70} \times 4$).

The skilled artisan will be familiar with IPv4 and IPv6 per se. IPv6 specifies a new packet format, designed to minimize packet header processing by routers. IPv6 includes a larger address space, enhanced multi-casting, stateless address auto-configuration (SLAAC), mandatory support for network layer security, simplified processing by routers, enhanced mobility, options extensibility, and support for so-called "jumbograms."

In a typical consumer scenario, a home network is assigned a /56 block, which is a block of 65,536 /64 blocks. Each /64 block contains $(2^{(128-64)})=18,446,744,073,709,551,616$ addresses. In one or more embodiments, if spam (or other malicious activity) is seen from an address, the entire /64 block is assigned an integer value representing its negative reputation. Adjacent /64 blocks are assigned a different (lesser) integer, reflecting their probable but not certain contamination. Blocks adjacent to those are assigned an even smaller integer, and so on.

For example, assume the block 2001:db8:1234:5678::/64 is assigned to a consumer. Spam is received from the address 2001:db8:1234:5678:98:76ff:fe54:321. The block 2001:db8:1234:5678::/64 is assigned a reputation score of 256 . The blocks 2001:db8:1234:5677 and 2001:db8:1234:5679 are assigned a reputation score of 128. The blocks 2001:db8:1234:5676 and 2001:db8:1234:567a are assigned a reputation score of 64 . The blocks 2001:db8:1234:5675 and 2001:

db8:1234:567b are assigned a reputation score of 32. The blocks 2001:db8:1234:5674 and 2001:db8:1234:567c are assigned a reputation score of 16. The blocks 2001:db8:1234:5673 and 2001:db8:1234:567d are assigned a reputation score of 8. The blocks 2001:db8:1234:5672 and 2001:db8:1234:567e are assigned a reputation score of 4. The blocks 2001:dh8:1234:5671 and 2001:db8:1234:567f are assigned a reputation score of 2.

If spam is later received from 2001:db8:1234:5673:1234:56ff:fe78:9abc, a reputation score of 256 will be added to its existing reputation of 8 assigned to 2001:db8:1234:5673.

This scoring process is illustrated in the table of FIG. 10.

In a non-limiting example, the server system may set a reputation threshold of 256: traffic will not be accepted from any host from a network with a score of 256 or higher. This setting "blacklists" a /64 block once a single spam message is seen. A threshold of 200 or 150 only blacklists after two messages from a range. Local policy decisions may be made as to what threshold indicates an acceptable level of certainty.

The values above are exemplary and non-limiting: assigning 100 to the malicious /64 block, 90 to adjacent blocks, and so on, is a non-limiting example of one of many possible alternative schemes.

In a preferred but non-limiting approach, a decay mechanism is provided, so that a negative reputation is not permanent—addresses can be reassigned, and hosts can be disinfected, following either of which traffic may be desirable.

Thus, by way of review and provision of additional detail, IPv6 has very large amounts of address space. Heretofore, the home typically only had one address and if there was spam activity or other inappropriate behavior, it was fairly straightforward to simply block the single offending address. This was perhaps somewhat crude, but quite effective. However, in IPv6, a range of addresses is assigned to the customer; the range includes billions of addresses. Blocking a single address is not effective because a had actor, such as a source of spam, will simply switch to a different address in the block.

The WINDOWS operating system, by default, renumbers to a different address block every 24 hours. Furthermore, different ISPs will be assigning different sizes of blocks of addresses to their customers. Thus, it is not possible to know a priori how many addresses need to be blocked to reduce or eliminate spam. One or more embodiments of the invention start with the minimum size block; namely, a /64 block in IPv6. When malicious traffic is seen from an address, traffic from the minimum size block is blocked and the neighboring blocks are marked as suspicious. Note the distinction between a "block" of addresses and "blocking" traffic form a certain location; the skilled artisan will appreciate from the context which usage of "block" is intended.

When malicious traffic is noted from a neighboring block, the blocks in between the two malicious blocks are probably also suspect. One aspect of one or more embodiments of the invention includes the concept of scoring blocks, such that if malicious traffic is seen from one address range, and from another, nearby, address range, it can be inferred that everything in between is likely to be malicious. Different weights of scoring are used at different levels and policy rules are set; depending on what is sought to be protected and how much protection it is desired to offer, different thresholds can be set for what type of traffic is to be allowed from a block that has a certain score set to it.

One specific non-limiting context has been set in FIGS. 1-4 above (i.e., a cable MSO providing data such as high-speed Internet as well as entertainment); however, embodiments of the invention can be implemented in many different locations within many different network architectures. One or more embodiments can he implemented, for example, on firewalls; in SPAM filtering mechanisms (e.g., software on a mail server or a hardware appliance in front of a mail server to protect it); in an intrusion prevention system (a hardware appliance); or even within antivirus software. One particular preferred but non-limiting application is within the context of an ISP or an e-mail system of some kind; for example, in an ISP's e-mail system or on the mail platform of an over-the-top provider such as Yahoo, Google, Microsoft, TWC, Comcast, AT&T, and the like. While it is also possible implement one or more embodiments on a consumer device, the foregoing examples are presently believed to be more preferable. Other possible locations for implementation of one or more embodiments include within firewall and filtering services such as provided by Barracuda Networks; within Cisco Ironport e-mail security devices; within Message Systems electronic message management products; within messaging infrastructure and security solutions such as those provided by Cloudmark; within security software such as that provided by Symantec; and the like.

In one or more embodiments, the rules are coded in software and/or written in a policy file.

Figure 6:
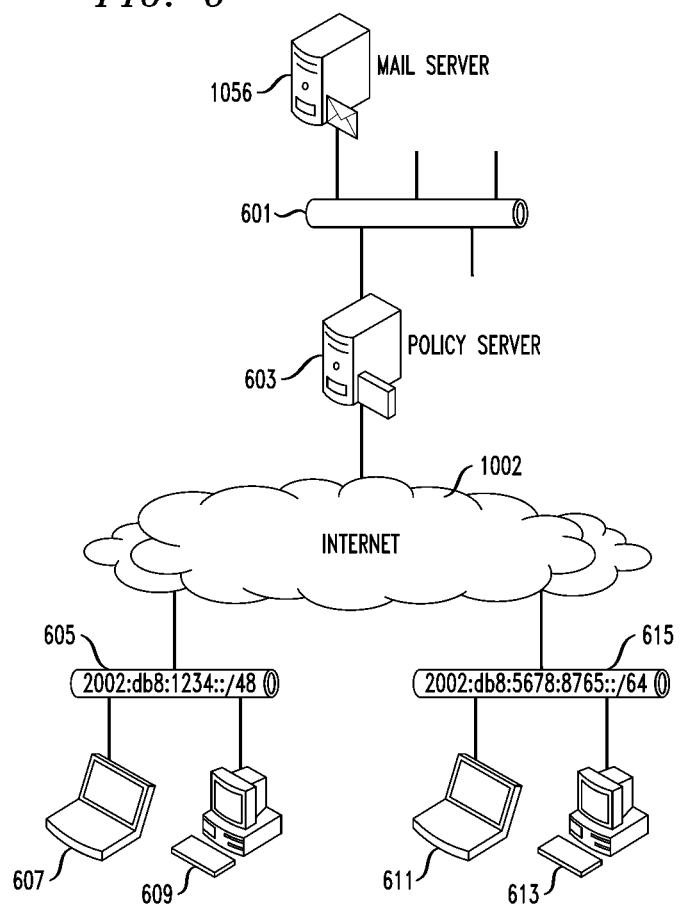
FIG. 6 is an exemplary network diagram, in accordance with an aspect of the invention.

Attention should now be given to FIG. 6, which depicts one non-limiting manner in which techniques according to aspects of the invention can be implemented within a network. The network diagram of FIG. 6 shows two independent users (networks 605 and 616), and how a mail server 1056 and policy server 603 may be separate. Note that mail server 1056 has received the same reference character as mail servers 1056 in FIG. 1, but could be located anywhere with respect to any kind of network, and is not necessarily limited to be located in an RDC of a cable MSO as in FIG. 1. Again, for the avoidance of doubt, it is to be emphasized that embodiments of the invention can be employed in a variety of situations. For example, the mail server could belong to an independent organization, such as a mail hosting company (Gmail. Yahoo!, or AOL), who could also apply one or more techniques of the invention. Organizations such as private companies who run their own mail servers for their employees could use embodiments of the invention to protect their systems. Further, uses of embodiments of the invention are not limited to mail systems; in another embodiment, web servers which are subject to denial of service attacks could use aspects of the invention to implement rate-limiting or packet filtering. One or more embodiments of the invention could be applied to multiple servers in a data center, or even multiple systems correlated in multiple data centers, by sharing scores among several instances of systems in accordance with aspects of the invention.

In FIG. 6, a first network 605, having address 2002:db8:1234::/48 is connected to Internet 1002. Network 605 includes one or more networked devices such as laptop computer 607 and desktop computer 609. Furthermore, a second network 615, having address 2002db:5678:8765:/64 is also connected to Internet 1002. Network 615 includes one or more networked devices such as laptop computer 611 and desktop computer 613.

Policy server 603 is also coupled to Internet 1002 and includes one or more software modules to implement aspects of the invention, such as, for example, one or more of those discussed below in connection with FIG. 7, as appropriate. Policy server 603 is coupled to mail server 1056 via a network 601 such as a LAN and employs one or more reputation-establishing techniques, examples of which are disclosed herein, to protect mail server 1056 from spam and the like. It is to be emphasized that the configuration in FIG. 6 is non-limiting; techniques of one or more embodiments of the invention can be implemented in many different ways. For example, the functionality of the policy server and mail server could be combined in a single server or other device, or appropriate functionality could be included in a firewall, intrusion prevention system, or other suitable location as discussed elsewhere herein.

Figure 7:
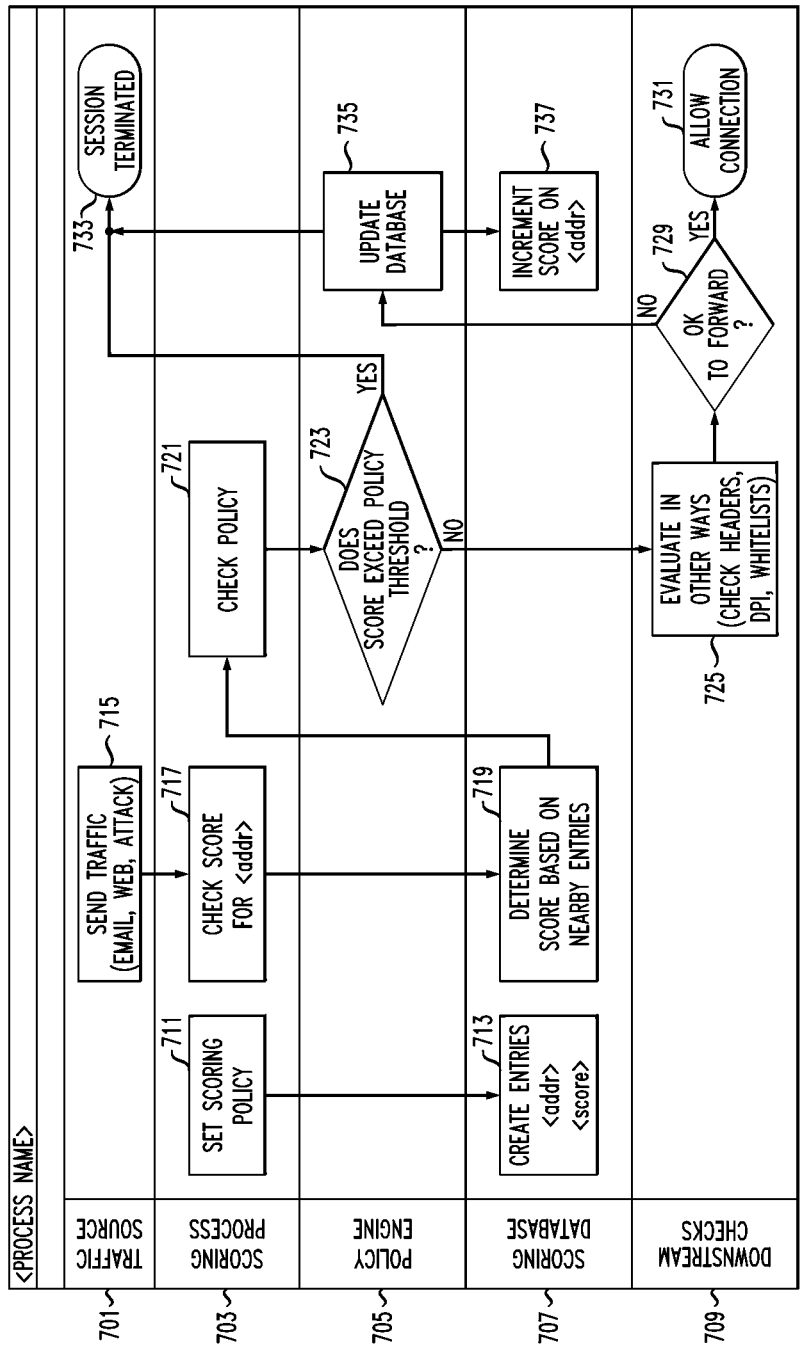
FIG. 7 is a flow chart of an exemplary method, according to an aspect of the invention, annotated to depict which components implement which steps.

FIG. 7 is a flowchart showing method steps and corresponding software and hardware elements. The components include one or more traffic sources 701 (e.g., networks 605, 615 or devices connected therewith); a scoring process 703 (software process on policy server 603 or combined device); a policy engine 705 (software module on policy server 603 or combined device); a scoring database 707 (suitable database software on policy server 603 or combined device accessing records in a hardware memory, preferably non-volatile); and an optional downstream checking module 709. Downstream checking module 709 can include a software module running on one or more hardware processors, and/or one or more dedicated hardware modules. A reputation system can hand off an e-mail that has passed a reputation check, but other checking can be done as described below (for example, for presence of suspect words in the subject line or suspicious material discovered via deep packet inspection (DPI)). Thus, a downstream system can decide that even though there is no bad reputation currently for the address, the message is still spam, and thus the reputation score for the address should be incremented. This is, in essence, a feedback loop kind of process. The downstream checking module could be located on the same device where the scoring is being carried out, but can run the checks after the scoring; or can he located on any kind of device downstream of the device where the scoring is taking place; or can be distributed over two or more devices which may or may not include the same device where the scoring is being carried out. Non-limiting examples include policy server 603, mail server 1056, and/or a combined device, firewall, or related security or intrusion prevention device) which optionally applies additional checks to traffic from a location having a score that does not exceed the policy threshold.

In step 711, the aforementioned scoring process sets the scoring policy (e.g., increment to score for each block containing an address that sends spam or the like; increment to adjacent blocks, next adjacent blocks, and so on; and spam threshold score for blocking). One non-limiting example of such a policy is as described above with respect to FIG. 10. For example, a reputation threshold of 256 could he set, such that traffic will not be accepted from any host from a network with a score of 256 or higher. This setting "blacklists" a /64 block once a single spam message is seen; immediately adjacent blocks are assigned 128, next adjacent 64, and so on as described above. In an alternative approach, a threshold of 200 or 150 only blacklists after two messages from a range. Local policy decisions may be made in step 711 as to what threshold indicates an acceptable level of certainty. Again, as noted above, all these values are exemplary and non-limiting: assigning 100 to the malicious /64 block, 90 to adjacent blocks, and so on, is a non-limiting example of one of many possible alternative schemes.

In step 713, the scoring database module creates entries, in accordance with the scoring policy set in step 711, for those addresses that already have spam or similar activity. The records can be in the form, for example, of <addr>, <score>. Step 713 can, in effect, be ongoing, as additional spam indications for additional addresses are obtained while the system is in operation—see discussion of steps 735 and 737 below. In some instances, all addresses are initially assumed to be "OK" and the scoring takes place as a result of feedback from the downstream process as described with respect to steps 725, 729, 735, 737 below. In such cases, step 713 may be viewed as effectively being optional.

Steps 711 and 713 could involve, for example, administrative tasks and/or could be based in whole or in part on default values.

In step 715, the traffic source 701 sends traffic such as email, web traffic, or an attack. In step 717, scoring process 703 checks database 707 for the current score for the address from which the traffic is received in step 715. In step 719, the scoring database 707 determines the updated score for the address from which the traffic was received in step 715, taking into account not only the score for the address per se but also that of nearby entries. Note that in some instances, the scores for prefixes adjacent to that from which the spam arises are updated contemporaneously (defined as at the same time or shortly thereafter as part of the same sequence of calculations) with the score for the prefix from which the spam arises. In other instances, only the score for the prefix from which the spam arises is updated, and the score for prefixes adjacent to that from which the spam arises are updated "on the fly" on an as-needed basis. Referring to FIG. 10, in the first approach, when spam is obtained from 2001:db8:1234:5678, the score for 2001:db8:1234:5678 is incremented by 256 to 256, and the scores for all the adjacent blocks out to 2001:db8:1234:5680:: and 2001:db8:1234:5670:: are also incremented as shown in the table. In the second approach, when spam is obtained from 2001:db8:1234:5678, the score for 2001:db8:1234:5678 is incremented by 256 to 256, but the scores for all the adjacent blocks out to 2001:db8:1234:5680:: and 2001:db8:1234:5670:: are not incremented as shown in the table until they are actually needed (i.e., when the score for one of the adjacent blocks becomes relevant due to receiving traffic from that block).

In one or more embodiments, it is known from steps 725 and 729 when spam or other malicious traffic comes, so as to update the data as per 735, 737. In some cases, existing data is used to assign initial scores to at least some prefixes, in step 713. In other cases, all blocks are initially assumed to be "OK" and reputation is gradually assigned via steps 725, 729, 735, 737. In the first approach mentioned above, step 719 is effectively running in parallel with steps 715 and 717 such that the score for each block that has ever had spam is continuously updated, as well as the score for those adjacent blocks that have been impacted in accordance with the scheme. Then, the address from which the new traffic comes is checked against this continuously updated data in steps 717 and 721. In the second approach mentioned above, step 719 is run on-the-fly on an as-needed basis.

Furthermore, in some cases, the process can be run for some time to populate the reputation database without policing traffic based on reputation in step 723; and only after the reputation database is sufficiently populated is traffic policed in accordance with the reputation score.

In step 721, scoring process 703 checks the current scoring policy. Then, in decision block 723, policy engine 705 determines if the score from step 719 exceeds the allowable threshold from the policy. If this is so, as per the "YES" branch of block 723, the session with the traffic source 701 in question is terminated at step 733.

On the other hand, if policy engine 705 determines that the score from step 719 does not exceed the allowable score from the policy, as per the "NO" branch of block 723, optionally, step 725 is performed. In step 725, the traffic received in step 715 is evaluated in other ways; for example, by checking the headers, performing deep packet inspection (DPI), checking against whitelists, or the like. In decision block 729, a determination is made, based on the evaluation in step 725, whether it is safe and appropriate to forward the traffic received in step 715. If so, as per the "YES" branch of decision block 729, the connection is allowed, as per step 731. On the other hand, if it is determined in step 729 that it is not safe and appropriate to forward the traffic received in step 715, as per the "NO" branch of decision block 729, the database 707 is updated by the policy engine 705 in step 735; the score for the particular address is incremented in the scoring database 707, as per step 737, and the session with the traffic source 701 in question is terminated at step 733. Steps 725, 729, 731 may be carried out by the downstream checking module as described above.

Figure 9:
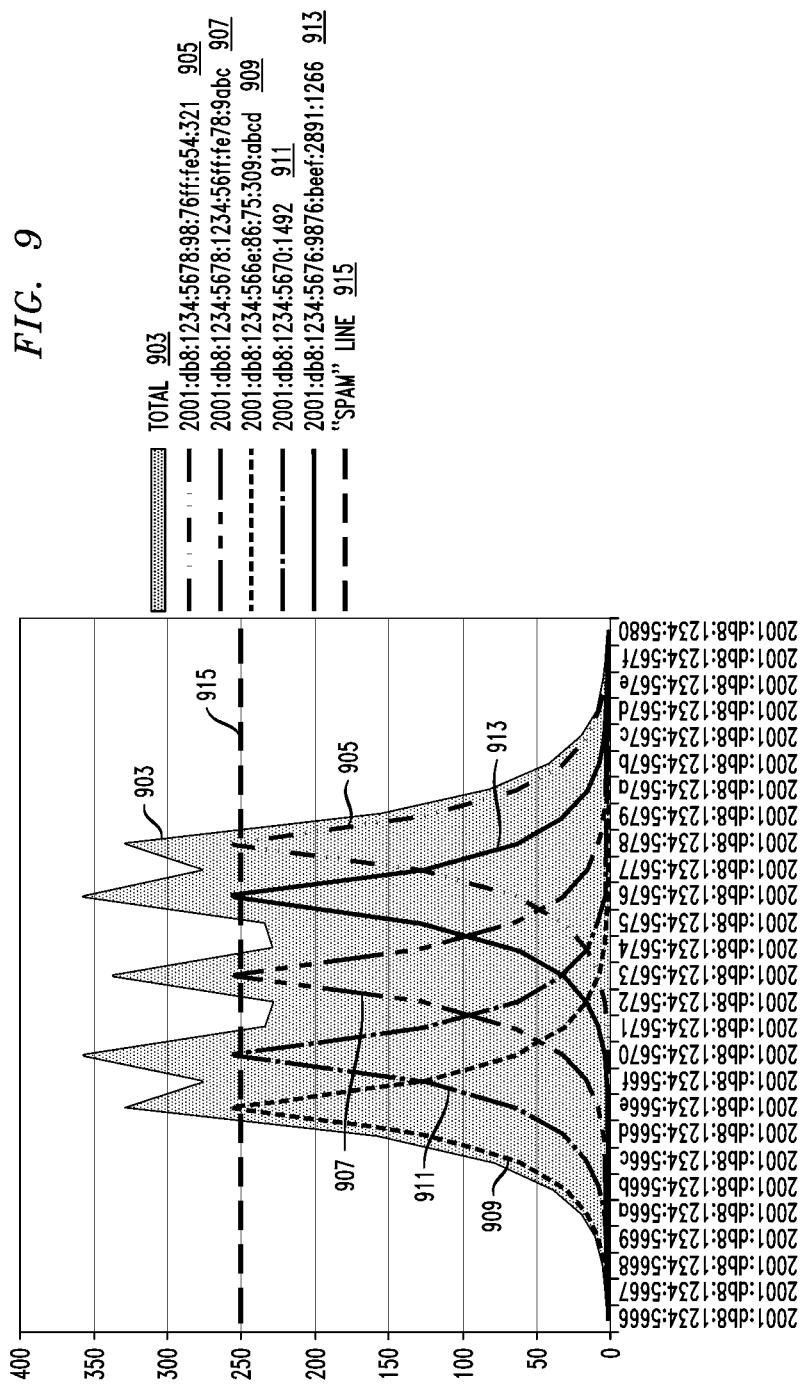
FIG. 9 is a visual representation of reputation assignment, in accordance with an aspect of the invention.

FIG. 9 provides an exemplary visualization of how scoring is applied. A reputation event (such as a SPAM message) is received from 5 IP addresses. They are:

2001:db8:1234:5678:98:76ff:fe54:321 (designated as 905)
2001:db8:1234:5673:1234:56ff:fe78:9abc (designated as 907)
2001:db8:1234:566e:86:75:309:abcd (designated as 909)
2001:db8:1234:5670:1492 (designated as 911)
2001:db8:1234:5676:9876:beef:2891:1266 (designated as 913)

Scores are assigned to all the IPv6 addresses between 2001:db8:1234:5666 (leftmost point on the horizontal X axis) and 2001:db8:1234:5680 (rightmost point on the horizontal axis). FIG. 9 is for the case where it is assumed that a bad reputation is given to any IP address with a score >250 (see "spam" line 915). The IP addresses are on the X axis, and the score is on the Y axis. If the IP address has a value (as represented by the total 903) above the dotted line at 250, then that IP block is considered "bad," and will treated accordingly.

In another aspect (internet protocol version 4 network address translation or IPv4 NAT), where a network operator such as an Internet Service Provider (ISP) is using large-scale network address translation (LSN; also known as carrier-grade NAT (CGN) and NAT44) to share a single IPv4 address among multiple users, by allocating a range of ports to each user, the same mechanism as described above could be applied. For instance, the operator would not know the range of ports assigned to a user, but could score ports exactly as would be done in the IPv6 embodiments above:

| Address:Port | Score following spam from 192.168.50.100:5678 | Score added after spam received from 192.168.50.100:5673 | Total reputation score |
|---|---|---|---|
| 192.168.50.100:5675 | 32 | 64 | 96 |
| 192.168.50.100:5676 | 64 | 32 | 96 |
| 192.168.50.100:5677 | 128 | 16 | 144 |
| 192.168.50.100:5678 | 256 | 8 | 264 |
| 192.168.50.100:5679 | 128 | 4 | 132 |
| 192.168.50.100:567a | 64 | 2 | 66 |
| 192.168.50.100:567b | 32 | 1 | 33 |

In still another aspect (internet protocol version 4 individual or IPv4 individual), one or more of the techniques described are applied to regular, individual IPv4 addresses.

Given the discussion thus far, it will be appreciated that, in general terms, an exemplary method, according to an aspect of the invention, includes the step; for example, as shown at 715, of obtaining traffic from a plurality of internet protocol version six addresses within a plurality of internet protocol version six blocks. This step can be implemented, for example, via a network port of a server, firewall device, or the like. A further step, for example, as shown at 729, includes obtaining a first indication of inappropriate traffic from a first one of the internet protocol version six addresses (for the avoidance of doubt, "from" in this context means that the inappropriate traffic emanates from the first one of the IPv6 addresses; the indication thereof may come, for example, from a downstream process as described elsewhere herein). This can be carried out, for example, via the downstream checking module comprising specialized hardware and/or a downstream checking software module executing on at least one hardware processor.

In response to the first indication of inappropriate traffic, several steps are carried out, as shown at 735, 737. These steps include incrementing a reputation score for a first given one of the blocks, containing the first one of the Internet protocol version six addresses, by a first predetermined amount; and incrementing a reputation score for a second given one of the blocks, adjacent the first given one of the blocks, by a second predetermined amount which is less than the first predetermined amount. These steps can be carried out, for example, by the policy engine module executing on at least one hardware processor and the scoring database module executing on at least one hardware module. In some cases, such as the on-the-fly approach discussed above, the incrementing of the reputation score for the adjacent block(s) can be carried out by the software program that is obtaining the traffic; e.g., by the mail software. In any case, the rules to be applied are those created in step 711 and checked in step 721. The policy engine could thus reside with the other components, or be located at least in part on the machine where the software program that is obtaining the traffic resides.

It should be noted that the process just described can optionally be iterated recursively (incrementing adjacent blocks iteratively until no further incrementing is possible).

Examples of these steps are shown in FIG. 10 and the accompanying text. The first given one of the blocks is prefix 2001:db8:1234:5678:: and the second given one of the blocks is either prefix 2001:db8:1234:5677:: or prefix 2001:a8:1234:5679::—it will of course be appreciated that in many embodiments, the adjacent blocks on each side have their scores incremented by the second predetermined amount. Furthermore, in many embodiments, the next adjacent blocks also have their scores incremented by third predetermined amounts (e.g., 2001:db8:1234:5676:: and 2001:db8:1234:567a:: are incremented by 64), and so on.

A still further step includes passing or blocking the traffic from the plurality of internet protocol version six addresses within the plurality of internet protocol version six blocks, in accordance with a policy based on the incremented reputation scores for the first and second given ones of the blocks (e.g., a policy applied to addresses with a reputation score matching or exceeding a specified value). That is to say, passing or blocking traffic is based on the user/administrator's policy decision of how to apply the score, not the score per se. Blocking is seen at 723 ("YES" branch), 733, while passing is seen at 723 ("NO" branch), 725, 729 ("YES" branch), 731. This step can be carried out, for example, by the policy engine module and/or downstream checking module. The session can be terminated in a variety of ways. The policy engine 705 makes the termination decision and issues an appropriate command to effectuate it or cause it to be effectuated. It can cause the session to terminate by, for example, sending a TCP FIN; sending a TCP RESET; updating an access list to indicate that traffic from the "bad" IP address should be denied; in SMTP, sending back a message denied for administrative reasons e-mail; sending an HTML message that access is dis-allowed; or the like.

In at least some embodiments, in the incrementing steps, the first and second given ones of the blocks are the smallest delegable blocks in IPv6; typically, /64 blocks.

In one or more embodiments, the scoring process is ongoing. So, for example, steps 725, 729 may be repeated for additional traffic, such that a second indication of inappropriate traffic is obtained from a second one of the internet protocol version six addresses (for example, 2001:db8:1234:5673 as seen in FIG. 10). In response to the second indication of inappropriate traffic, several steps are carried out. One of these steps includes incrementing a reputation score for a third given one of the blocks (e.g., block 2001:db8:1234:5673::), containing the second one of the internet protocol version six addresses, by the first predetermined amount. Another of these steps includes incrementing a reputation score for a fourth given one of the blocks (e.g., 2001:db8:1234:5672:: or 2001:db8:1234:5674::), adjacent the third given one of the blocks, by the second predetermined amount. Again, it will of course be appreciated that in many embodiments, the adjacent blocks on each side of block 2001:db8:1234:5673:: have their scores incremented by the second predetermined amount. Furthermore, in many embodiments, the next adjacent blocks also have their scores incremented by third predetermined amounts (e.g., 2001:db8:1234:5671:: and 2001:db8:1234:5675:: are incremented by 64), and so on. In this case, the passing or blocking of the traffic is further in accordance with the incremented reputation scores for the third and fourth given ones of the blocks; e.g., in accordance with the total reputation score in the last column of FIG. 10. The repeated steps can be carried out using the same hardware and/or software as described above.

Thus, in one or more embodiments, a further step includes incrementing a reputation score for a fifth given one of the blocks, adjacent the first given one of the blocks, by the second predetermined amount; and incrementing a reputation score for a sixth given one of the blocks, adjacent the third given one of the blocks, by the second predetermined amount (i.e., the adjacent blocks on each side of the block with the spam each have their reputation scores incremented by the second predetermined amounts).

In one or more embodiments, an additional step includes assigning initial values of the reputation score to at least a portion of the plurality of internet protocol version six blocks; for example, initial values of zero and/or nonzero initial values where there is some a priori basis to be able to know or estimate reputation. In other instances, no initial values are assigned and the scores are allowed to develop over time based on feedback. Initial score assignment could be carried out, for example, via a human expert interfacing with the database using a graphical user interface (GUI) or the like.

As seen at steps 723 and 737, the passing or blocking of the traffic in accordance with the incremented reputation scores for the first, second, third and fourth given ones of the blocks includes computing a total reputation score for at least the first, second, third and fourth given ones of the blocks, passing traffic for which a total reputation score threshold value is not exceeded, and blocking traffic for which the total reputation score threshold value is exceeded.

As noted, in some cases, a decay process is allowed to permit "rehabilitation" of prefixes with a bad score that are subsequently repaired. Thus, in some cases, a further step includes, after passage of a predetermined time during which none of the inappropriate traffic is received, allowing decay of the total reputation score. For example, in some cases, every X minutes (or other time units), the score for a block is decremented. It can be decremented in "one fell swoop" back to zero or can be gradually decremented in smaller steps over time. The administrator can set these rules in step 711, for example. When the pertinent score is less than the policy threshold, traffic will be forwarded. For example, if the downstream engine(s) determine that traffic received is malicious, in one implementation the score will be increased by the full 256 points, for example. The ramification is that an address block will be temporarily blocked based on maliciousness, and, if after being removed from blocking, it still sends malicious traffic, the bad host will be blocked longer. For example, if traffic is blocked at a score of 255, then when 2001:db8:1234:5678:: gets a score of 256, it is blocked. If there is a one-hour decay, then after two hours its score is 254, and it can send traffic. If it then sends malicious traffic, it could be assigned another 256 points, for a new score of 510; it will be another 256 hours before it is allowed again. Whether this additional score should be added to all neighbors is a policy decision; however, in a presently preferred but non-limiting approach, the additional score is not added to all the neighbors, since a "very malicious" 2001:db8:1234:5678:: does not necessarily mean that 2001:db8:1234:5677:: is even more suspicious.

In some instances, the first predetermined amount includes a first integer and the second predetermined amount includes a second integer. In some cases, the second integer is half of the first integer. In some cases, the first integer is 256 and the second integer is 128.

In one or more embodiments, the threshold value is selected to block the traffic for any given one of the internet protocol version six blocks having at least one instance of the inappropriate traffic.

As noted, the reputation score for adjacent block(s) can be incremented contemporaneously with the step of incrementing the reputation score for the first given one of the blocks, or can be carried out on the fly, on an as-needed basis, after the step of incrementing the reputation score for the first given one of the blocks.

Furthermore, one or more embodiments include the additional step of providing a system. In some cases, the system includes at least one hardware processor 820; at least one network port coupled to the at least one hardware processor (see notation to/from network in FIG. 8); and at least two distinct software modules. Each of the distinct software modules is embodied on a tangible computer-readable recordable storage medium. The distinct software modules can include, for example, a score calculation module and a traffic policing module. The obtaining of the traffic can be carried out by the network port. A downstream checking module may generate the first indication of inappropriate traffic. The processor may obtain the indication in a variety of ways; for example, over a network port or other interface if from an external device, or via internal communication from one of the software modules if from the same device. The incrementing of the reputation score for the first and second given ones of the blocks can be carried out by the score calculation module executing on the at least one hardware processor. The passing or blocking of the traffic is controlled by the traffic policing module executing on the at least one hardware processor.

In other cases, the system includes at least one hardware processor; at least one network port coupled to the at least one hardware processor; and a plurality of distinct software modules. Each of the distinct software modules is embodied on a tangible computer-readable recordable storage medium, and the distinct software modules include a policy engine module, a scoring process module, and a scoring database module. The obtaining of the traffic can be carried out by the network port. A downstream checking module may generate the first indication of inappropriate traffic. The processor may obtain the indication in a variety of ways; for example, over a network port or other interface if from an external device, or via internal communication from one of the software modules if from the same device. The incrementing of the reputation score for the first and second given ones of the blocks is carried out by the policy engine module, in cooperation with the scoring process module, executing on the at least one hardware processor; and the passing or blocking of the traffic is controlled by the policy engine module executing on the at least one hardware processor.

In another aspect, with reference to the IPv4 NAT embodiment, in some cases, an exemplary method includes the steps of: obtaining traffic from a plurality of ports for a given internet protocol version four address, the ports including at least one of transfer control protocol (TCP) ports and user datagram protocol (UDP) ports; and obtaining a first indication of inappropriate traffic from a first one of the ports. Additional steps, responsive to the first indication of inappropriate traffic, include incrementing a reputation score for the first one of the ports, by a first predetermined amount; and incrementing a reputation score for a second one of the ports, adjacent the first one of the ports, by a second predetermined amount which is less than the first predetermined amount. It should be noted that the process just described can optionally be iterated recursively (incrementing adjacent blocks iteratively until no further incrementing is possible). A further step includes passing or blocking the traffic from the plurality of ports, in accordance with a policy based on the incremented reputation scores for the first and second given ones of the ports (e.g., a policy applied to addresses with a reputation score matching or exceeding a specified value). That is to say, passing or blocking traffic is based on the user/administrator's policy decision of how to apply the score, not the score per se. The method can use logic similar to that in FIG. 7 and a hardware and software configuration similar to that described for the IPv6 embodiment.

In another aspect, with reference to the IPv4 individual embodiment, in some cases, an exemplary method includes the steps of: obtaining traffic from a plurality of internet protocol version four addresses; and obtaining a first indication of inappropriate traffic from a first one of the internet protocol version four addresses. Further steps, responsive to the first indication of inappropriate traffic, include incrementing a reputation score for the first one of the internet protocol version four addresses, by a first predetermined amount; and incrementing a reputation score for at least a second one of the internet protocol version four addresses, adjacent the first one of the internet protocol version four addresses, by a second predetermined amount which is less than the first predetermined amount. It should be noted that the process just described can optionally be iterated recursively (incrementing adjacent blocks iteratively until no further incrementing is possible). A further step includes passing or blocking the traffic from the plurality of internet protocol version four addresses in accordance with a policy based on the incremented reputation scores for the first and second the internet protocol version four addresses (e.g., a policy applied to addresses with a reputation score matching or exceeding a specified value). That is to say, passing or blocking traffic is based on the user/administrator's policy decision of how to apply the score, not the score per se. The method can use logic similar to that in FIG. 7 and a hardware and software configuration similar to that described for the IPv6 embodiment. In one or more instances of this embodiment, because the address space is so much smaller, an entry is kept for each address, and thus there are a plurality of addresses each with its own database entry.

In still another aspect, an exemplary apparatus includes at least one hardware processor 820; at least one network port (see to/from network annotation in FIG. 8) coupled to the at least one hardware processor; at least one memory 830 coupled to the at least one processor; and at least two distinct software modules. Each of the distinct software modules is embodied on a tangible computer-readable recordable storage medium. The distinct software modules include, in some circumstances, a score calculation module and a traffic policing module. In other circumstances, the distinct software modules include a policy engine module, a scoring process module, and a scoring database module. The components of the apparatus are configured to implement the methods as described elsewhere herein.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Figure 8:
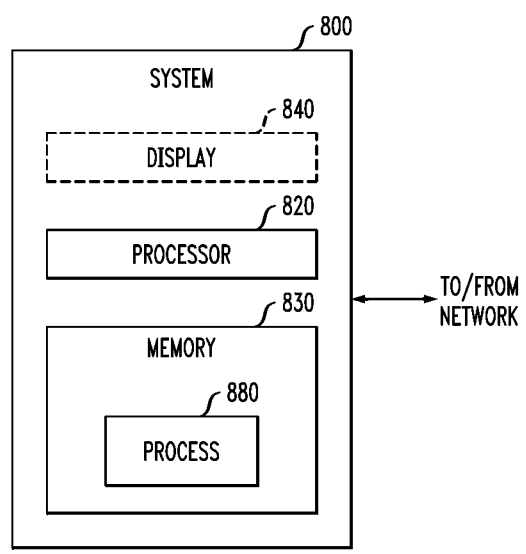
FIG. 8 is a block diagram of a computer system useful in connection with one or more aspects of the invention.

FIG. 8 is a block diagram of a system 800 that can implement at least some aspects of the invention, and is representative, for example, of mail server 1056, policy server 603, a combined server implementing functionality of both the mail and policy servers, or any of the other servers shown in the figures. The processor, memory, and process are also representative of aspects of the functionality of firewalls, intrusion prevention systems, and the like. As shown in FIG. 8, memory 830 configures the processor 820 to implement one or more methods, steps, and functions (collectively, shown as process 880 in FIG. 8). The memory 830 could be distributed or local and the processor 820 could be distributed or singular. Different steps could be carried out by different processors.

The memory 830 could be implemented as an electrical, magnetic or optical memory, or any combination of these or other types of storage devices. It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC rather than using firmware. Display 840 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 800 or processing capability on a firewall, intrusion prevention system, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on server 603, server 1056, a combined server, a firewall, an intrusion prevention system, and the like, and that such program may be embodied on a tangible computer readable recordable storage medium. As used herein, including the claims, a "server" includes a physical data processing system (for example, system 800 as shown in FIG. 8) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. scoring process module 703, policy engine module 705, scoring database module 707, and optionally a downstream checking module 709). In a broader aspect, the modules could generally include a score calculation module and a traffic policing module. The method steps can then be carried out using the distinct software modules of the system, as described above, executing on one or more hardware processors (e.g., a processor or processors in server 603, server 1056, a combined server, a firewall, an intrusion prevention system, and the like). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining traffic from a plurality of internet protocol version six addresses within a plurality of internet protocol version six blocks;
   obtaining a first indication of inappropriate traffic from a first one of said internet protocol version six addresses;
   responsive to said first indication of inappropriate traffic:
   incrementing a reputation score for a first block of said blocks, containing said first one of said internet protocol version six addresses, by a first predetermined amount; and
   incrementing a reputation score for a plurality of pairs of blocks adjacent to said first block in said internet protocol version six addresses using successively smaller predetermined amounts for each of said pair of blocks successively farther from said first block, wherein each of said successively smaller predetermined amounts is less than said first predetermined amount, wherein blocks of a given pair of blocks have respective addresses separated by said first one of said internet protocol version six addresses; and passing or blocking said traffic from said plurality of internet protocol version six addresses within said plurality of internet protocol version six blocks, in accordance with a policy based on said incremented reputation scores for said first block and said plurality of pairs of blocks adjacent to said first block.

2. The method of claim 1, wherein, in said incrementing steps, said first block and each block of said plurality of pairs of blocks comprise smallest delegable blocks in said internet protocol version six.

3. The method of claim 2, wherein, in said incrementing steps, said first block and each block of said plurality of pairs of blocks comprise 64-bit blocks.

4. The method of claim 1, further comprising:
obtaining a second indication of inappropriate traffic from a second one of said internet protocol version six addresses;
responsive to said second indication of inappropriate traffic:
incrementing a reputation score for a second block of said blocks, containing said second one of said internet protocol version six addresses, by said first predetermined amount; and
incrementing a reputation score for a plurality of pairs of blocks adjacent to said second block in said internet protocol version six addresses using said successively smaller predetermined amounts for each of said pair of blocks successively farther from said second block;
wherein said passing or blocking of said traffic is further in accordance with said incremented reputation scores for said second block and said plurality of pairs of blocks adjacent to said second block.

5. The method of claim 4, further comprising assigning initial values of said reputation score to at least a portion of said plurality of internet protocol version six blocks.

6. The method of claim 5, wherein said initial values comprise zero.

7. The method of claim 4, wherein said passing or blocking of said traffic in accordance with said incremented reputation scores for said first block, said plurality of pairs of blocks adjacent to said first block, said second block and said plurality of pairs of blocks adjacent to said second block comprises computing a total reputation score for at least said first block, said plurality of pairs of blocks adjacent to said first block, said second block and said plurality of pairs of blocks adjacent to said second block, passing traffic for which a total reputation score threshold value is not exceeded, and blocking traffic for which said total reputation score threshold value is exceeded.

8. The method of claim 7, further comprising, after passage of a predetermined time during which none of said inappropriate traffic is received, allowing decay of said total reputation score.

9. The method of claim 7, wherein said first predetermined amount comprises a first integer and said successively smaller predetermined amounts comprise respective integers.

10. The method of claim 7, wherein said threshold value is selected to block said traffic for any given one of said internet protocol version six blocks having at least one instance of said inappropriate traffic.

11. The method of claim 1, wherein said step of incrementing said reputation score for said plurality of pairs of blocks is carried out contemporaneously with said step of incrementing said reputation score for said first given one of said blocks.

12. The method of claim 1, wherein said step of incrementing said reputation score for said plurality of pairs of blocks is carried out on the fly, on an as-needed basis, after said step of incrementing said reputation score for said first given one of said blocks.

13. The method of claim 1,
wherein:
said obtaining of said traffic is carried out by a network port of a system;
said incrementing of said reputation score for said first block and said plurality of pairs of blocks is carried out by a score calculation module executing on at least one hardware processor of said system, said score calculation module being embodied on a non-transitory computer-readable recordable storage medium of said system; and
said passing or blocking of said traffic is controlled by a traffic policing module executing on said at least one hardware processor, said traffic policing module being embodied on said non-transitory computer-readable recordable storage medium of said system.

14. The method of claim 1,
wherein:
said obtaining of said traffic is carried out by a network port of a system;
said incrementing of said reputation score for said first block and said plurality of pairs of blocks is carried out by a policy engine module, in cooperation with a scoring process module, executing on at least one hardware processor of said system, said policy engine module and said scoring process module being embodied on one or more non-transitory computer-readable recordable storage medium of said system; and
said passing or blocking of said traffic is controlled by said policy engine module executing on said at least one hardware processor.

15. An apparatus comprising:
at least one hardware processor;
at least one network port coupled to the at least one hardware processor;
at least one memory coupled to the at least one processor; and
at least two distinct software modules, each of the distinct software modules being embodied on a tangible computer-readable recordable storage medium, and wherein the distinct software modules comprise a score calculation module and a traffic policing module;
wherein:
said at least one network port is configured to obtain traffic from a plurality of internet protocol version six addresses within a plurality of internet protocol version six blocks;
said at least one processor is configured to obtain a first indication of inappropriate traffic from a first one of said internet protocol version six addresses;
said score calculation module, when loaded into said memory, causes said at least one hardware processor, in response to said first indication of inappropriate traffic, to:
increment a reputation score for a first block of said blocks, containing said first one of said internet protocol version six addresses, by a first predetermined amount; and
increment a reputation score for a plurality of pairs of blocks adjacent to said first block in said internet protocol version six addresses using successively smaller predetermined amounts for each of said pair of blocks successively farther from said first block, wherein each of said successively smaller predetermined amounts is less than said first predetermined amount, wherein blocks of a given pair of blocks have respective addresses separated by said first one of said internet protocol version six addresses; and said traffic policing module, when loaded into said memory, causes said at least one hardware processor to pass or block said traffic from said plurality of internet protocol version six addresses within said plurality of internet protocol version six blocks, in accordance with a policy based on said incremented reputation scores for said first block and said plurality of pairs of blocks adjacent to said first block.

16. The apparatus of claim 15, wherein said score calculation module, when loaded into said memory, causes said at least one hardware processor to increment said reputation score for said plurality of pairs of blocks contemporaneously with said incrementing of said reputation score for said first block.

17. The apparatus of claim 15, wherein said score calculation module, when loaded into said memory, causes said at least one hardware processor to increment said reputation score for said plurality of pairs of blocks on the fly, on an as-needed basis, after said incrementing of said reputation score for said first block.

18. The apparatus of claim 15, wherein, in said incrementing, said first block and each block of said plurality of pairs of blocks comprise smallest delegable blocks in said internet protocol version six.

19. The apparatus of claim 18, wherein, in said incrementing, said first block and each block of said plurality of pairs of blocks comprise 64-bit blocks.

20. The apparatus of claim 15, wherein score calculation module, when loaded into said memory, causes said at least one hardware processor, in response to said first indication of inappropriate traffic, to iterate said incrementing recursively.

* * * * *